United States Patent Office 3,257,345
Patented June 21, 1966

3,257,345
ONE-PART ELECTRICAL-INSULATING RESIN COMPOSITION COMPRISING AN EPOXY RESIN
Herbert M. Bond, Stillwater Township, Washington County, and Charles K. Heasley, St. Paul, Minn., assignors to Minnesota Mining and Manufacturing Company, St. Paul, Minn., a corporation of Delaware
No Drawing. Filed Dec. 16, 1960, Ser. No. 76,096
7 Claims. (Cl. 260—22)

This invention relates to a one-part epoxy resin composition which is stable for months at room temperature but which cures upon heating to a strong, flexible, heat-resistant state. The invention is particularly concerned with the impregnation and/or encapsulation of coils, motors, transformers and other electrical equipment, taking advantage of the excellent electrical-insulating properties of the heat-cured epoxy resin composition. Since essentially no volatiles are given off in the heat-curing, the novel resin composition cures to a dense, void-free state. Moreover, the tenacity with which the composition adheres to surfaces contacted during curing, coupled with the good moisture and heat resistance of the cured product, insures that encapsulated electrical equipment is well protected.

There has been a long-felt need, particularly in the electrical industry, for a shelf-stable, one-part liquid resin composition which would heat-cure without evolution of volatiles to a strong, flexible state. Heretofore, most stable one-part resin compositions have been powders and have depended upon incompatibility of ingredients for stability and have not been convenient to use for impregnation of electrical equipment. Moreover, previously available shelf-stable, one-part epoxy resin compositions cure to an overly rigid state for electrical impregnating-encapsulating use.

The stable, one-part resin composition of the present invention includes three essential ingredients: (1) acid-terminated polyester, (2) liquid epoxy resin and (3) catalyst. These three general classes of materials are disclosed and broadly claimed in the copending application of Kurt A. Kurka and Herbert M. Bond, Serial No. 834,407, filed August 18, 1959, now Patent No. 3,027,279. The present invention involves the discovery that by selecting certain materials from the broad classes disclosed in said Kurka and Bond application, a shelf-stable, one-part liquid composition is attained which is heat-curable to a flexible state. More specifically, the present invention is based on two specific catalysts which in admixture with epoxy resin and one of a narrow class of polyesters within the much broader class of Kurka and Bond yield the much-sought shelf-stable, one-part liquid composition. The two specific catalysts are tin tetrachloride, which is conveniently employed as a hydrate such as the trihydrate or pentahydrate, and dicyandiamide. When the former is used, it should be employed in an amount within about 0.01 to 0.5% by weight of the total acid-terminated polyester and epoxy resin in the composition. As for dicyandiamide, about 0.5 to 4% is satisfactory. Below these approximate lower limits, the curing is somewhat sluggish, whereas at substantially above these ranges, the composition is less stable than is desirable.

The acid-terminated polyester of the novel epoxy resin composition is a branched-chain polyester of dicarboxylic acid, dihydroxy alcohol and a polyfunctional compound selected from the class consisting of polyhydric alcohols having at least three nontertiary hydroxyl groups and polybasic acids having at least three carboxyl groups. From 2 to 8 percent of the total of said acids and alcohols contain aromatic rings. At much less than 2 percent, the strength of cured product is less than desirable for most intended purposes and electrical insulating values are lower than is desirable. At much over 8 percent, the viscosity of the polyester tends to be unduly high. In any event, it is preferred that the viscosity of the polyester be less than about 300,000 centipoises at 23° C.

The polyester is further characterized by containing an average of 2.1 to 3.0 carboxyl groups per molecule, an acid number of 20–155, and a hydroxyl number of less than 10. Accordingly, its number average molecular weight $\overline{M}_n$ is 1900–15,000 calculated from its number average degree of polymerization $\overline{X}_n$ of 10–80. The skeletal chain is essentially free from ethylenic unsaturation which would otherwise deleteriously affect the resistance to deterioration of the cured insulating resin. The polyester will not gel when heated in the absence of air. Preferably, its skeletal chain is essentially free from ether oxygen, the presence of which tends to make the cured products of the invention less resistant to moisture and thus less resistant to electrical breakdown, although the effect is minor if the ether oxygen is directly attached to an aromatic ring.

Preferably, the acid-terminated polyester includes at least 2.2 carboxyl groups to achieve high strength and toughness in the cured product. If the polyester is prepared using trifunctional acid or alcohol, the average number of carboxyl groups should not exceed about 3.0, or the polyester tends to gel prematurely to an unusable state. When tetrafunctional acid or alcohol is used, the average number of carboxyl groups should not exceed about 2.3 if premature gelation is to be avoided. With acids and alcohols of still higher functionality, the average number of free carboxyl groups per molecule must be further reduced, but in no event to less than 2.1.

If the polyester has an acid number of less than about 20, in which case its number average molecular weight exceeds about 15,000 calculated from its number average degree of polymerization of above about 80, the rate of reaction is slow and the reaction product might not be fully cured to a tough, infusible, insoluble state, even if heated for a long period. If the acid number is greater than about 155, in which case its number average molecular weight is less than about 1900 calculated from its number average degree of polymerization of less than about 10, the cured product is harder and less flexible than is desired for most purposes.

The hydroxyl number of polyester should not exceed 10 and preferably is less than 5. A larger hydroxyl number indicates incomplete reaction between the acid and alcohol components of the polyester, in which event the products of reaction with the epoxy resin are of relatively poor quality.

The other essential ingredient of the electrical insulating composition of this invention is an epoxy resin containing at least 1.5 oxirane groups per average molecular weight, the skeletal backbone chain of which is free from other than oxygen and carbon atoms, which epoxy resin is so selected that a simple mixture of the acid-terminated polyester, catalyst and epoxy resin does not exceed 300,000 centipoises in viscosity at 23° C. Particularly useful are liquid polyglycidyl ethers of polyhydric phenols such as resorcinol or bisphenol A which usually have slightly less than 2.0 oxirane groups per average molecular weight, but sometimes have more than 2.0 oxirane groups. For example, polyglycidyl ethers of phenolformaldehyde novolaks (e.g., "Epiphen 849") having 2.5 to 3 oxirane groups per average molecular weight have demonstrated utility in the formation of shelf-stable, one-part liquid resin compositions of this invention. Also useful is the liquid alicyclic epoxy resin of the formula

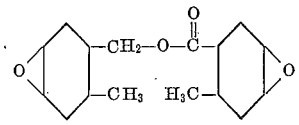

such as the resin presently marketed as "Unox–201."

Other useful nonpolymeric epoxy resins include limonene dioxide, dicyclopentadiene dioxide, vinylcyclohexene dioxide and 3,4 - epoxy - 6 - methylcyclohexylmethyl-3,4-epoxy-6-methylclohexane-carboxylate.

Preferably the epoxy resin is aromatic or cyclic in nature. However, polyglycidyl ethers of polyhydric alcohols such as glycol and glycerol have also produced self-stable, one-part, heat-curable resin compositions in the practice of the present invention, although the cured products thereof are somewhat weak for electrical casting uses.

The viscosity of the uncured composition of the present invention and the flexibility of the heat-cured product thereof may be enhanced by the presence of monoepoxides such as dodecene oxide, octylene oxide, dipentene monoxide, alpha-pinene oxide, styrene oxide, phenyl glycidyl ether, vinylcyclohexene monoxide and epoxidized long-chain olefins, e.g., of 16–18 carbon atoms. However, the strength of cured product and its electrical insulating properties are thereby decreased, so that the use and amount of monoepoxide depends on compromise considerations. In any event, the monoepoxide should not contribute more than about 10% of the total oxirane groups in the composition.

The viscosity of the uncured composition may also be depressed by a compatible liquid polycarboxylic acid anhydride such as an alkenyl succinic anhydride or methylendomethylenetetrahydrophthalic anhydride (which is presently marketed as "Methyl Nadic Anhydride"). However, the shelf-stability is lessened, and in an erratic fashion, so that it is preferred that the anhydride not contribute more than about 25% of the total carboxyl groups in the compositions.

With all ingredients containing oxirane and carboxyl groups taken into account, it is preferred that the novel uncured composition contain on the order of 1.3 oxirane groups per carboxyl group. However (compositions with as few as 0.8 and as many as 2.1 oxirane groups per carboxyl group have provided heat-cured products of decreased, but adequate, strength.

The novel compositions may also include inorganic fillers, such as ground mica, slate or calcium carbonate, diluents such as liquid chlorinated diphenyl, and pigments. In order to product the thixotropic material which becomes very fluid at elevated temperatures, a thixotropic agent such as finely powdered silica, aluminum silicate, or aluminum stearate may be employed.

Preparation and properties of typical branched-chain, acid-terminated polyesters having utility in the present invention are described below.

POLYESTER A

This polyester was formed by the hot melt fusion process in an inert atmosphere using a three-neck glass flask fitted with stirrer, thermometer, gas inlet tube and Barret trap. Between the flask and the Barret trap was a steam heated column packed with glass helices. The flask was charged with 3471 grams (23.75 moles) of adipic acid, 208 grams (1.25 moles) of isophthalic acid, 1384 grams (18.18 moles) of propylene glycol, 306 grams (2.27 moles) of trimethylolpropane and 8 grams triphenyl phosphite catalyst. The temperature was slowly raised to 230° C., with the water of condensation which began to form at 140° C., removed continuously by a stream of nitrogen. After more than two hours, when little water was being removed, a vacuum was applied to reduce the pressure to less than 10 mm. of mercury for an additional period of time with continued heating at 200–230° C. The reaction was discontinued when the acid number reached 84. The product had a number average molecular weight of about 4000 calculated from a number average degree of polymerization of 20 and contained an average of about 3.0 carboxyl groups per molecule. The viscosity of the polyester at 23° C. was 115,000 centipoises. Its equivalent weight based on carboxyl groups was 670.

POLYESTER B

This polyester was prepared in the manner of Polyester A using 2882 grams (14.25 moles) of "Isosebacic acid," 125 grams (0.75 mole) of isophthalic acid, 830 grams (10.91 moles) of propylene glycol, 184 grams (1.36 moles) of trimethylolpropane and 6 grams of tripenyl phosphite catalyst. "Isosebacic acid" is a product of U.S. Industrial Chemicals Co., a division of National Distillers and Chemical Co., consisting by weight of 72–80% 2-ethylsuberic acid, 12–18% 2,5-diethyladipic acid, and 6–10% n-sebacic acid.

This polyester had an acid number of 66, a number average molecular weight of about 4600 calculated from a number average degree of polymerization of 20, and contained an average of about 3.0 carboxyl groups per molecule. The viscosity of the polyester at 23° C. was 44,000 centipoises. Its equivalent weight based on carboxyl groups was 850.

POLYESTER C

A mixture of 3425 grams (23.44 moles) of adipic acid, 260 grams (1.57 moles) of isophthalic acid, 1384 grams (18.18 moles) of propylene glycol, 306 grams (2.27 moles) of trimethylolpropane, and 71 grams of anitomy trioxide catalyst was reacted as in the preparation of Polyester A to an acid number of 84. The number average molecular weight was about 3000 calculated from a number average degree of polymerization was 20, and there was an average of 3.0 carboxyl groups per molecule. The equivalent weight based on carboxyl groups was 668, and the viscosity at 23° C. was 120,000 centiposes.

POLYESTER D

This polyester was prepared from 1096 grams (7.50 moles) of adipic acid, 139 grams (0.84 mole) of isophthalic acid, 461 grams (6.06 moles) of propylene glycol, 102 grams (0.76 mole) of trimethylolpropane and 2 grams of triphenyl phosphite catalyst by the same procedure as Polyester A. It had an acid number of 83, a number average molecular weight of about 3000 calculated from a number average degree of polymerization of 20, and contained an average of 3.0 carboxyl groups per molecule. The equivalent weight based on carboxyl groups was 676, and the viscosity at 23° C. was 146,000 centipoises.

Illustrative compositions of the present invention are described in the following examples, in the first of which is employed a typical epoxy resin which is marketed commercially as "Epon 828." This resin is a condensation product of epichlorhydrin and bisphenol A, has a Durrans' softening point of about 10° C. and an epoxide equivalent of about 190.

*Example 1*

To a mixture of 65 parts of Polyester A and 35 parts of liquid epoxy resin was added 0.1% $SnCl_4 \cdot 5H_2O$ catalyst. The tin salt was melted into the polyester and cooled to room temperature prior to mixing with the epoxy component; this prevents gelation. One hundred grams of this resin were poured into an aluminum dish to a depth of 0.125 inch and cured at 300° F for 16 hours. The resulting casting was tough and rubbery. Its tensile strength was 1500 p.s.i. and elongation was 180% at break. This casting absorbed only about 1% water when immersed for a period of 10 days. The volume resistivity of the cured resin was $8 \times 10^{12}$ ohm-cm., an exceedingly high value for a flexible resin.

Another sample of this cured resin was placed in an oven at 150° C. After one month it was found to be still tough and flexible, and its durometer hardness had increased only from 18 to 27, showing unusually good resistance to heat aging for a flexible resin.

The uncured epoxy resin composition of this example was stored for eight months at room temperature (70° F.±5° F.), in which time it increased in viscosity only 5% over an initial value of 180,000 centipoises.

*Example II*

To the uncured, freshly-prepared composition of Example I was added 50 parts of ground mica and as a thixotropic agent, 7.5 parts of "Bentone 38" (ammonium organic complex in magnesium montmorillonite) with thorough mixing, followed by paint milling until a smooth homogeneous mass was obtained.

A container of this epoxy resin composition was placed in a chamber which was then evacuated. Then, with the resin at about room temperature, an electric motor which had been heated to 250°–300° F. was immersed, so that the resin became very fluid to fill all interstices and larger voids in the motor. Upon withdrawal, resin adhered to all exposed metal as a fairly thick covering. Upon air cooling directly above the resin tank, some drip-back occurred, but the motor remained thoroughly covered with resin. When dripping ceased, the motor was placed in an oven for 16 hours at 300° F. to cure the resin, whereupon the resin became tenaciously bonded to all parts of the motor.

This insulated motor was then run continuously for one day in water followed by one day in an oven at 135° C., with this cycle continued for six weeks, after which time the motor was still operating satisfactorily.

*Example III*

An epoxy resin composition identical to that of Example I, except for the use of Polyester B instead of Polyester A and the reduction in amount of epoxy resin from 35 to 30 parts, exhibited equivalent shelf-stability. When heat-cured at 300° F. for 16 hours, this composition yielded a tough, rubbery, heat-resistant product having outstanding adhesion to materials employed in electrical equipment such as copper, paper and oriented polyethylene terephthalate film.

*Example IV*

The following composition was prepared:

| | Parts |
|---|---|
| Polyester A | 65 |
| "EP-201" epoxy resin | 35 |
| Dicyandiamide | 2 |

The structure of "EP-201" epoxy resin, which is presently marketed as "Unox-201," is described hereinabove.

The dicyandiamide was finely ground and melted into a mixture of the other two ingredients in the same manner as in Example I. The resultant composition was stable for months at room temperature but was cured at 300° F. for 24 hours to a tough, rubbery, infusible, insoluble state.

An identical composition except for the substitution of 0.1 part of tin tetrachloride pentahydrate for the dicyanamide catalyst exhibited equivalent results.

Dicyandiamide has also been used in place of the tin salt catalyst in compositions such as that of Example I with good results.

Among dicarboxylic acids other than those disclosed above which can be used in making acid-terminated polyesters useful in the present invention are o-phthalic acid, azelaic acid, and chlorendic anhydride. Among other dihydroxy alcohols are 1,4-butane diol and ethylene glycol. Another suitable dihydroxy alcohol is 2,2-bis[4-(2-hydroxy-propoxy)phenyl]propane. In addition to trimethylolpropane as the polyfunctional compound, glycerol and pentaerythritol and polycarboxylic acids such as trimesic acid, citric acid, trimellitic acid, benzene tetracarboxylic acid and tricarballylic acid also have utility.

What is claimed is:

1. A one-part liquid electrical-insulating resin composition which is stable for months at room temperature and cures upon heating to a strong, flexible, heat-resistant, infusible, insoluble state, said resin composition comprising a blend of (1) a branched-chain, acid-terminated polyester of dicarboxylic acid, dihydroxy alcohol and a polyfunctional compound selected from the class consisting of polyhydric alcohols having at least three nontertiary hydroxyl groups and polybasic acids having at least three carboxyl groups, from 2 to 8 percent of the total of said acids and alcohols containing aromatic rings, which polyester contains an average of 2.1 to 3.0 carboxyl groups per molecule, has an acid number of 20–155, a hydroxyl number of less than 10, is free from ethylenic unsaturation in its skeletal chain, and has a viscosity at 23° C. of less than 300,000 centipoises, (2) an epoxy resin containing at least 1.5 oxirane groups per average molecular weight, the skeletal backbone chain of which is free from other than oxygen and carbon atoms, and (3) a catalyst selected from the group consisting of 0.01–0.5% hydrated tin tetrachloride and 0.5–4% dicyandiamide, the percentage of catalyst being based on the total of ingredients (1) plus (2), said blend containing about 0.8 to 2 epoxy groups per carboxyl group, and the epoxy resin being so selected that a simple mixture of ingredients (1), (2) and (3) does not exceed 300,000 centipoises in viscosity at 23° C.

2. The heat-curable resin composition defined in claim 1 with which is blended a thixotropic agent.

3. A one-part liquid electrical-insulating resin composition which is stable for months at room temperature and cures upon heating to a strong, flexible heat-resistant, infusible, insoluble state, said resin composition comprising a blend of (1) a branched-chain, acid-terminated polyester of dicarboxylic acid, 5–15 mol percent of which contains aromatic rings, dihydroxy aliphatic alcohol and a polyhydric alcohol having at least three nontertiary hydroxyl groups, which polyester contains an average of 2.1 to 3.0 carboxyl groups per molecule, has an acid number of 20–155, a hydroxyl number of less than 5, is free from ethylenic unsaturation in its skeletal chain, is free from ether oxygen other than oxygen attached directly to an aromatic ring, and has a viscosity at 23° C. of less than 300,000 centipoises, (2) an epoxy resin containing at least 1.5 oxirane groups per average molecular weight, which epoxy resin is a polyglycidyl ether of a polyhydric phenol, and (3) a catalyst selected from the group consisting of 0.01–0.5% hydrated tin tetrachloride and 0.5–4% dicyandiamide, the percentage of catalyst being based on the total of ingredients (1) plus (2), said blend containing about 0.8 to 2.1 epoxy groups per carboxyl group, and the epoxy resin being so selected that a simple mixture of ingredients (1), (2) and (3) does not exceed 300,000 centipoises in viscosity at 23° C.

4. The heat-curable resin composition defined in claim 3 wherein the catalyst is about 0.1% tin tetrachloride pentahydrate and said blend contains about 1.3 epoxy groups per carboxyl group.

5. A one-part liquid electrical-insulating resin composition which is stable for months at room temperature and cures upon heating to a strong, flexible, heat-resistant, infusible, insoluble state, said resin composition comprising a blend of (1) a branched-chain, acid-terminated polyester of dicarboxylic acid, dihydroxy alcohol and a polyfunctional compound selected from the class consisting of polyhydric alcohols having at least three nontertiary hydroxyl groups and polybasic acids having at least three carboxyl groups, from 2 to 8 percent of the total of said acids and alcohols containing aromatic rings, which polyester contains an average of 2.1 to 3.0 carboxyl groups per molecule, has an acid number of 20–155, a hydroxyl number of less than 10, is free from ethylenic unsaturation in its skeletal chain, and has a viscosity at 23° C. of less than 300,000 centipoises, (2) an epoxy resin containing at least 1.5 oxirane groups per average molecular weight, which epoxy resin is a polyglycidyl ether of a polyhydric phenol, and (3) a catalyst selected from the group consisting of 0.01–0.5% hydrated tin tetrachloride and 0.5–4% dicyandiamide, the percentage of catalyst being based on the total of ingredients (1) plus (2), the proportion of catalyst in any event being so selected that the composition is stable at room temperature but cures within 24 hours at 300° F., said blend containing about 0.8 to 2 epoxy groups per carboxyl group, and the epoxy resin being so selected that a simple mixture of ingredients (1), (2) and (3) does not exceed 300,000 centipoises in viscosity at 23° C.

6. A one-part liquid electrical-insulating resin composition which is stable for months at room temperature and cures upon heating to a strong, flexible, heat-resistant, infusible, insoluble state, said resin composition comprising a blend of (1 a branched-chain, acid-terminated polyester of dicarboxylic acid, dihydroxy alcohol and a polyfunctional compound selected from the class consisting of polyhydric alcohols having at least three nontertiary hydroxyl groups and polybasic acids having at least three carboxyl groups, from 2 to 8 percent of the total of said acids and alcohols containing aromatic rings, which polyester contains an average of 2.1 to 3.0 carboxyl groups per molecule, has an acid number of 20–155, a hydroxyl number of less than 10, is free from ethylenic unsaturation in its skeletal chain, and has a viscosity at 23° C. of less than 300,000 centipoises, (2) an epoxy resin containing at least 1.5 oxirane groups per average molecular weight, the skeletal backbone chain of which is free from other than oxygen and carbon atoms, and (3) hydrated tin tetrachloride as catalyst in an amount from 0.01 to 0.5% of the total of ingredients (1) plus (2), said blend containing about 0.8 to 2 epoxy groups per carboxyl group, and the epoxy resin being so selected that a simple mixture of ingredients (1), (2) and (3) does not exceed 300,000 centipoises in viscosity at 23° C.

7. A one-part liquid electrical-insulating resin composition which is stable for months at room temperature and cures upon heating to a strong, flexible, heat-resistant, infusible, insoluble state, said resin composition comprising a blend of (1) a branched-chain, acid-terminated polyester of dicarboxylic acid, dihydroxy alcohol and a polyfunctional compound selected from the class consisting of polyhydric alcohols having at least three non-tertiary hydroxyl groups and polybasic acids having at least three carboxyl groups, from 2 to 8 percent of the total of said acids and alcohols containing aromatic rings, which polyester contains an average of 2.1 to 3.0 carboxyl groups per molecule, has an acid number of 20–155, a hydroxyl number of less than 10, is free from ethylenic unsaturation in its skeletal chain, and has a viscosity at 23° C. of less than 300,000 centipoises, (2) an epoxy resin containing at least 1.5 oxirane groups per average molecular weight, the skeletal backbone chain of which is free from other than oxygen and carbon atoms, and (3) dicyandiamide as catalyst in an amount from 0.5 to 4% of the total of ingredients (1) plus (2), said blend containing about 0.8 to 2 epoxy groups per carboxyl group, and the epoxy resin being so selected that a simple mixture of ingredients (1), (2) and (3) does not exceed 300,000 centipoises in viscosity at 23° C.

References Cited by the Examiner

UNITED STATES PATENTS

| | | | |
|---|---|---|---|
| 2,785,383 | 3/1957 | Foster | 260—22 |
| 2,794,791 | 6/1957 | Patton | 260—34.2 |
| 2,830,038 | 4/1958 | Pattison | 260—2 |
| 2,999,824 | 9/1960 | Singleton et al. | 260—22 |
| 3,027,279 | 3/1962 | Kurka et al. | 260—835 |

FOREIGN PATENTS 833,649    4/1960    Great Britain.

OTHER REFERENCES

Lee et al.: Epoxy Resins, McGraw-Hill, 1957, York, Pa., 305 pages, p. 110 relied on.

LEON J. BERCOVITZ, *Primary Examiner.*

MILTON STERMAN, *Examiner.*

H. E. TAYLOR, JR., R. W. GRIFFIN,
                  *Assistant Examiners.*